US012335062B2

(12) United States Patent
Sundararajan et al.

(10) Patent No.: US 12,335,062 B2
(45) Date of Patent: Jun. 17, 2025

(54) SHARING TRANSPORT INTERFACES BETWEEN TENANTS ON MULTI-TENANT EDGE DEVICES

(71) Applicant: Cisco Technology, Inc., San Jose, CA (US)

(72) Inventors: Balaji Sundararajan, Fremont, CA (US); Ajeet Pal Singh Gill, Fremont, CA (US); Srilatha Tangirala, San Jose, CA (US); Nithin Bangalore Raju, San Jose, CA (US); Ravi Kiran Chintallapudi, Pleasanton, CA (US); Pradeepan Kannawadi, Dublin, CA (US); Ganesh Devendrachar, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/608,677

(22) Filed: Mar. 18, 2024

(65) Prior Publication Data

US 2024/0223397 A1    Jul. 4, 2024

Related U.S. Application Data

(62) Division of application No. 17/979,255, filed on Nov. 2, 2022, now Pat. No. 11,962,429.

(51) Int. Cl.
*H04L 12/28* (2006.01)
*H04L 67/10* (2022.01)

(52) U.S. Cl.
CPC .............. *H04L 12/28* (2013.01); *H04L 67/10* (2013.01)

(58) Field of Classification Search
CPC ............................... H04L 12/28; H04L 67/10
See application file for complete search history.

(56) References Cited

U.S. PATENT DOCUMENTS 9,912,582 B2 * 3/2018 Pourzandi ............... H04L 41/40
11,575,541 B1 * 2/2023 Styszynski .......... H04L 12/4633
(Continued)

FOREIGN PATENT DOCUMENTS

WO    WO2022098760 A1    5/2022

OTHER PUBLICATIONS

PCT Search Report and Written Opinion mailed Jan. 26, 2024 for PCT Application No. PCT/US2023/036134 from PCt Summary, 28 pages.

*Primary Examiner* — Hua Fan
(74) *Attorney, Agent, or Firm* — Lee & Hayes, P.C.

(57) ABSTRACT

Techniques for virtualizing tenant transport interfaces configured to implement pertenant network routing attribute differentiation in each tenant overlay of a multisite wide area network (WAN) and share the virtual transport interfaces between multi-tenant edge (MTE) devices providing transport services to tenant devices based on a defined tenant tier model. A Software-Defined Networking (SDN) controller may receive a physical transport interface and/or a device type associated with a tenant device. The SDN controller may determine a virtual transport interface for the tenant device based on a tier associated with the tenant. MTE device(s) may utilize the physical transport interface to establish sessions with other MTE device(s) in the WAN. The virtual transport interface may be utilized by MTE devices to implement and/or enforce network routing attributes when forwarding network traffic associated with the tenant via the sessions established between the MTE devices through the WAN.

20 Claims, 5 Drawing Sheets

(56) References Cited

U.S. PATENT DOCUMENTS

| | | | |
|---|---|---|---|
| 2016/0212049 A1* | 7/2016 | Davie | H04L 41/0803 |
| 2016/0315808 A1* | 10/2016 | Saavedra | H04L 49/70 |
| 2016/0352745 A1* | 12/2016 | Ilieva | H04L 63/10 |
| 2019/0097838 A1* | 3/2019 | Sahoo | H04L 45/00 |
| 2019/0103990 A1 | 4/2019 | Cidon | |
| 2020/0034184 A1 | 1/2020 | Barabash et al. | |
| 2020/0403821 A1 | 12/2020 | Dev et al. | |
| 2020/0413283 A1 | 12/2020 | Shen et al. | |

\* cited by examiner

200 ⤴

```
┌─────────────────────────────────────────────────────────────────────┐
│ RECEIVE, AT A FIRST MULTI-TENANT EDGE (MTE) DEVICE ASSOCIATED WITH A │
│ FIRST SITE OF A MULTISITE WIDE AREA NETWORK (WAN), AN INDICATION THAT A │
│ TENANT DEVICE HAS CONNECTED TO THE FIRST SITE, THE INDICATION INCLUDING │
│ A PHYSICAL TRANSPORT INTERFACE ASSOCIATED WITH THE TENANT DEVICE    │
│                              202                                    │
└─────────────────────────────────────────────────────────────────────┘
                                  ↓
┌─────────────────────────────────────────────────────────────────────┐
│ SEND, FROM THE FIRST MTE DEVICE AND TO A SOFTWARE-DEFINED            │
│ NETWORKING (SDN) CONTROLLER ASSOCIATED WITH THE MULTISITE WAN        │
│ BASED AT LEAST IN PART ON THE INDICATION, A REQUEST FOR A VIRTUAL    │
│ TRANSPORT INTERFACE CONFIGURING THE TENANT DEVICE TO UTILIZE A       │
│ TRANSPORT SERVICE OF THE MULTISITE WAN, THE REQUEST INCLUDING THE    │
│ PHYSICAL TRANSPORT INTERFACE OF THE TENANT DEVICE AND A TYPE OF THE  │
│                         TENANT DEVICE                                │
│                              204                                    │
└─────────────────────────────────────────────────────────────────────┘
                                  ↓
┌─────────────────────────────────────────────────────────────────────┐
│ RECEIVE, AT THE FIRST MTE DEVICE AND FROM THE SDN CONTROLLER, THE    │
│ VIRTUAL TRANSPORT INTERFACE INCLUDING AN INDICATION OF ONE OR MORE   │
│ ROUTING ATTRIBUTES ASSOCIATED WITH THE TENANT DEVICE                 │
│                              206                                    │
└─────────────────────────────────────────────────────────────────────┘
                                  ↓
┌─────────────────────────────────────────────────────────────────────┐
│ ESTABLISH, AT LEAST PARTLY BY THE FIRST MTE DEVICE AND BASED AT LEAST │
│ IN PART ON THE PHYSICAL TRANSPORT INTERFACE OF THE TENANT DEVICE AND │
│ THE VIRTUAL TRANSPORT INTERFACE, A FIRST SESSION BETWEEN THE FIRST   │
│ MTE DEVICE AND A SECOND MTE DEVICE ASSOCIATED WITH A SECOND SITE OF  │
│ THE MULTISITE WAN, THE FIRST SESSION CONFIGURED TO PROVIDE THE ONE OR │
│ MORE ROUTING ATTRIBUTES ASSOCIATED WITH THE TENANT DEVICE            │
│                              208                                    │
└─────────────────────────────────────────────────────────────────────┘
                                  ↓
┌─────────────────────────────────────────────────────────────────────┐
│ SEND, FROM THE FIRST MTE DEVICE AND TO THE TENANT DEVICE, THE VIRTUAL │
│                    TRANSPORT INTERFACE                               │
│                              210                                    │
└─────────────────────────────────────────────────────────────────────┘
                                  ↓
┌─────────────────────────────────────────────────────────────────────┐
│ FORWARD, BY THE FIRST MTE DEVICE AND BASED AT LEAST IN PART ON THE   │
│ VIRTUAL TRANSPORT INTERFACE, NETWORK TRAFFIC FROM THE TENANT DEVICE  │
│ AND TO THE SECOND MTE DEVICE VIA THE FIRST SESSION                   │
│                              212                                    │
└─────────────────────────────────────────────────────────────────────┘
```

FIG. 2

SHARING TRANSPORT INTERFACES BETWEEN TENANTS ON MULTI-TENANT EDGE DEVICES

RELATED APPLICATIONS

This application claims priority to U.S. patent application Ser. No. 17/979,255, filed on Nov. 2, 2022, the entire contents of which are incorporated herein by reference and for all purposes.

TECHNICAL FIELD

The present disclosure relates generally to virtualizing tenant transport interfaces to provide per-tenant network routing attribute differentiation in each tenant overlay and share the virtual transport interfaces between multi-tenant edge devices providing transport services to tenant devices.

BACKGROUND

Service providers offer computing-based services, or solutions, to provide users with access to computing resources to fulfill users' computing resource needs without having to invent in and maintain computing infrastructure required to implement the services. These service providers often maintain networks of data centers which house servers, routers, and other devices that provide computing resources to users such as compute resources, networking resources, storage resources, database resources, application resources, security resources, and so forth. The solutions offered by service providers may include a wide range of services that may be fine-tuned to meet a user's needs. Managed service providers utilize multi-tenant gateways for providing software-defined wide area network (SDWAN) service(s) to multiple tenants, at hub sites or shared sites (e.g., the airport, the mall, etc.).

Multi-tenant gateways offer multiple WAN transport services such as multiprotocol label switching (MPLS), internet, metro ethernet, and the like. Some of these services guarantee service level agreements (SLAs), such as, for example, MPLS links, while other services operate in a best effort capacity, such as, for example, internet links. The WAN transport may be shared among multiple tenants for effective utilization and cost reduction for the manage service providers. However, tenants may want certain restrictions on WAN connections between sites, and each tenant should be allowed access to the shared transport service according to per-tenant contract terms with the managed service provider. Using a traditional shared WAN transport, it may be difficult to enforce per-tenant contract terms and/or restrictions on WAN connections between sites.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates a flow diagram of an example method for an MTE device of a multisite WAN to receive virtual transport interfaces, determined based on a defined tenant tier model, utilized to provide network routing attribute differentiation in individual tenant overlays, share the virtual transport interfaces with other MTE devices associated with the multisite WAN, establish per-tenant sessions with the other MTE devices, and provide WAN transport service access to tenant devices according the network routing attributes associated with a defined tier.

DESCRIPTION OF EXAMPLE EMBODIMENTS

Overview

Figure 1:
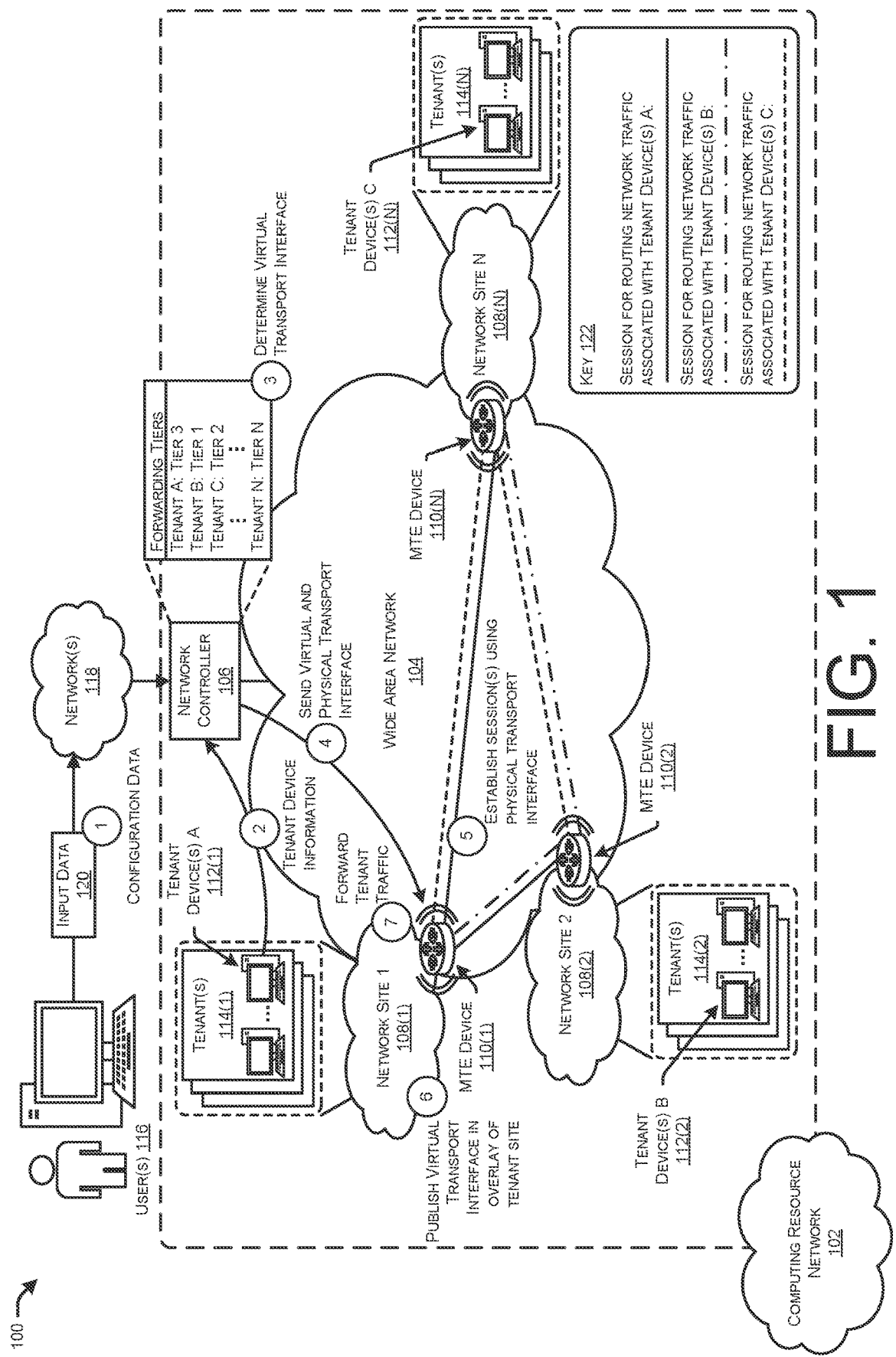
FIG. 1 illustrates a system architecture diagram of a computing resource network, such as, for example, a multisite wide area network (WAN) including a network controller configured to determine virtual transport interfaces, based on a defined tenant tier model, utilized to provide network routing attribute differentiation in individual tenant overlays and share the virtual transport interfaces between multi-tenant edge (MTE) devices providing WAN transport service access to tenant devices according the network routing attributes associated with a defined tier.

This disclosure describes method(s) for virtualizing tenant transport interfaces configured to implement per-tenant network routing attribute differentiation in each tenant overlay of a multisite wide area network and share the virtual transport interfaces between multi-tenant edge devices providing transport services to tenant devices based on a defined tenant tier model. The method includes receiving, at a first multi-tenant edge (MTE) device associated with a first site of a multisite wide area network (WAN), an indication that a tenant device has connected to the first site. In some examples, the indication includes a physical transport interface associated with the tenant device. Additionally, or alternatively, the method includes sending, from the first MTE device and to a Software-Defined Networking (SDN) controller associated with the multisite WAN based at least in part on the indication, a request for a virtual transport interface configuring the tenant device to utilize a transport service of the multisite WAN. In some examples, the request includes the physical transport interface of the tenant device and a type of the tenant device. Additionally, or alternatively, the method includes receiving, at the first MTE device and from the SDN controller, the virtual transport interface including an indication of one or more routing attributes associated with the tenant device. Additionally, or alternatively, the method includes establishing, at least partly by the first MTE device and based at least in part on the physical transport interface of the tenant device and the virtual transport interface, a first session between the first MTE device and a second MTE device associated with a second site of the multisite WAN. In some examples, the session may be configured to provide the one or more routing attributes associated with the tenant device. Additionally, or alternatively, the method includes sending, from the first MTE device and to the tenant device, the virtual transport interface. In some examples, the method includes forwarding, by the first MTE device and based at least in part on the virtual transport interface, network traffic from the tenant device and to the second MTE device via the first session.

Additionally, or alternatively, the method includes receiving, from a tenant device in a first site of a multisite wide area network (WAN), a request for a virtual transport interface configuring the tenant device to utilize a transport service of the multisite WAN. In some examples, the request may indicate a physical transport interface associated with the tenant device and a type of the tenant device. Additionally, or alternatively, the method includes determining, by a Software-Defined Networking (SDN) controller associated with the multisite WAN and based at least in part on the physical transport interface and the type of the tenant device, the virtual transport interface associated with the tenant device. In some examples, the virtual transport interface may indicate one or more routing attributes associated with the tenant device. Additionally, or alternatively, the method includes sending, to a first multi-tenant edge (MTE) device associated with the tenant, the physical transport interface of the tenant device and the virtual transport interface associated with the tenant device. Additionally, or alternatively, the method includes establishing one or more sessions between the first MTE device and one or more second MTE devices associated with the multisite WAN based at least in part on the physical transport interface. In some examples, the sessions may be configured to enforce the one or more routing attributes on network traffic associated with the tenant device. Additionally, or alternatively, the method includes forwarding the network traffic associated with the tenant device based at least in part on the virtual transport interface via the one or more sessions.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for a Software-Defined Networking (SDN) controller, associated with a computing resource network such as, for example, a software-defined wide area network (SDWAN), to virtualize tenant transport interfaces and implement per-tenant network routing attribute differentiation in each tenant overlay of the SDWAN and share the virtual transport interfaces between multi-tenant edge (MTE) devices of the SDWAN configured to provide transport services to tenant devices based on a defined tenant tier model. In some examples, the SDWAN may include various network sites hosting tenant devices and providing the tenants with multi-tenant access to transport services (e.g., MPLS, internet, metro ethernet, etc.) via an MTE device associated with a given network site. Tenants may register with the computing resource network according to a tenant tier model. A tenant's tier may include a list of allowed transport interfaces chosen from a set of pre-defined transport interfaces. For example, a tenant tier may include one or more allowed transport interfaces from one or more transport interfaces available for a given tenant device. Additionally, or alternatively, a tenant's tier may include one or more additional routing attributes associated with a given tier, such as, for example, per-tenant bandwidth, routing restrictions, tenant groups, and the like. In some examples, tenant tiers may be defined (e.g., structured tiers offering various links and attributes) and/or customizable (e.g., tenant may select specific attributes and/or links they wish to utilize).

The computing resource network may extend an overlay management protocol adding features configured to indicate a type of the device participating in the protocol (e.g., shared devices or single tenant devices). In some examples, an MTE device may be configured to publish its device type as a shared device, acting as a multi-tenant gateway device. Additionally, or alternatively, a tenant device may be configured to publish its device type as a single tenant device, acting as a single tenant utilizing the device. When registering with the computing resource network, the device may indicate its device type and a physical transport interface associated with the device, indicating the transport interfaces available for the device. Additionally, or alternatively, an MTE device may register with the computing resource network on behalf of a tenant device, providing the physical transport interface and device type of the tenant device. The SDN controller may then determine a virtual transport interface for the tenant device. In some examples, the SDN controller may determine the virtual transport interface based on the physical transport interface of the device and the tier associated with the tenant. For example, a first tenant device may include a first physical transport interface and may be associated with a first tier, while a second tenant device may include the same first physical transport interface and may be associated with a second tier, where the first tier is more favorable than the second tier. In some examples, the first tier may guarantee service level agreements (SLA) for the tenant, and the second tier may not guarantee SLA for the tenant. As such, the SDN controller may determine a first virtual transport interface for the first tenant, configuring the first tenant device to utilize MPLS links with 25 mbps of bandwidth, and a second virtual transport interface for the second tenant, configuring the second tenant device to utilize internet links with 25 mbps of bandwidth.

As previously described, the virtual transport interfaces may be determined based at least in part on a tier of one or more tiers associated with the tenant. Take, for example, a tier model comprising a first tier configured as a virtual transport interface utilizing internet link(s) (e.g., a network link configured as a best-effort network link) with 25 mbps of bandwidth, a second tier configured as a virtual transport interface utilizing internet link(s) and/or MPLS link(s) (e.g., a network link configured to guarantee a SLA) with 25 mbps of bandwidth on each, a third tier configured as a virtual transport interface utilizing internet link(s) and/or MPLS link(s) with 50 mbps of bandwidth on each, and/or a fourth tier configured as a virtual transport interface utilizing tenant specified network links with a tenant specified bandwidth on each (e.g., a custom tier specified by a tenant).

Tiers may be configured using tenant specific labels representing one or more network routing attributes on a given virtual transport interface. In some examples, the network routing attributes may indicate types of network links that should be utilized in association with a given virtual transport interface for a given tenant, bandwidth that should be allowed on network links associated with a given virtual transport interface for a given tenant, restrictions on a given virtual transport interface for a given tenant, and/or the like. For example, the network routing attributes may indicate the bandwidth that should be allowed for given links associated with a virtual transport interface, as previously described. Additionally, the network routing attributes may indicate one or more restrictions with respect to forwarding network traffic associated with a tenant device on the virtual transport interface. For example, network links (e.g., MPLS, internet, and/or any kind of WAN link) may be established connecting two separate sites where the tenant is present in both sites. In some examples, a tenant label on a given virtual transport interface utilized by the sites may restrict MPLS links to only other MPLS links, internet links to only other internet links, and/or the like.

The network controller (e.g., an SDN controller) and/or the MTE devices may utilize a pairwise key generation hierarchy to generate, store, and/or otherwise maintain unique interface mappings for each tenant. In some examples, a tenant label may be generated pertenant and used to store network routing attributes associated with the tenant to be utilized on a virtual transport interface when forwarding network traffic associated with a tenant device of the tenant. The mapping may be configured such that the physical transport interface is configured as a parent label and the virtual transport interface is configured as a child label. In some examples, the child label representing the virtual transport interface may store additional parameters associated with the tenant indicating the network routing attributes, allowing for the enforcement of such network routing attributes when forwarding network traffic associated with a client device via the virtual transport interface. Once the virtual transport interface has been determined for a tenant device, the SDN controller may send the physical transport interface and/or the virtual transport interface to an MTE device that is associated with the given tenant device. Additionally, or alternatively, the SDN controller may send the virtual transport interface directly to the tenant device. The MTE device may utilize the physical transport interface and/or the virtual transport interface to forward network traffic associated with the tenant device and enforce the one or more routing attributes on the network traffic. For example, a first MTE device may receive the physical transport interface and/or the virtual transport interface for the tenant device. The first MTE device may utilize the physical transport interface associated with the tenant device to establish a session between the first MTE device and a second MTE device associated with the computing resource network. In some examples, the first MTE device may send the physical transport interface and/or the virtual transport interface associated with the tenant device to the second MTE device to establish the session. A session may be established for a single tenant and configured to route all of the tenant's data through such a session. Such sessions may be configured to implement various network protocols for forwarding network traffic associated with the tenant device between various MTE device(s), such as, for example, internet protocol security (IPsec), bidirectional forwarding detection (BFD), and the like. Additionally, the first MTE device may publish the virtual transport interface in the corresponding tenant overlay. As such, all of the routes learned from the second MTE device may be created as next hop(s) and network traffic will be forwarded on the virtual transport interface associated with the tenant device.

As described herein, a computing-based, cloud-based solution and/or service generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to allowing tenant specific routing attributes on transport interfaces between sites of a wide area network. For instance, the techniques described herein may allow for the creation of a virtual transport interface for each tenant, utilized by MTE devices to enforce one or more network routing attributes when forwarding network traffic associated with the tenant. A network controller may generate the virtual transport interfaces for the tenants according to a physical transport interface of a tenant device (e.g., indicating allowable transport interfaces associated with a given tenant device) and/or a tier associated with the tenant using parameters indicating the network routing attributes such as, for example, types of network links, guaranteed bandwidth on network links, restrictions associated with network links, and the like. These attributes may be enforced by the MTE devices when forwarding network traffic associated with a given tenant between sites of a wide area network using a given virtual transport interface. MTE devices may generate and/or store a pairwise key hierarchy mapping a physical transport interface of a tenant device to a virtual transport interface associated with the tenant. By storing and using tenant specific virtual transport interfaces in this way, tenants may choose specific overlay connections that meet their needs with respect to network links (configured to implement SLAs or not), bandwidth guarantees for the network links, and/or restrictions associated with the network links. This allows for enforcement of tenant specific routing attributes when forwarding network traffic between sites of a wide area network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system architecture diagram 100 of a computing resource network 102, such as, for example, a multisite wide area network (WAN) 104 including a network controller 106 (also referred to herein as an SDN controller) configured to determine virtual transport interfaces, based on a defined tenant tier model, utilized to provide network routing attribute differentiation in individual tenant overlays (e.g., individual network sites 108(1)-(N)) and share the virtual transport interfaces between multi-tenant edge (MTE) devices 110(1)-(N) providing WAN transport service access to tenant devices 112(1)-(N) according the network routing attributes associated with a tier of a given tenant 114(1)-(N).

The computing resource network 102 may provide on-demand availability of computing system resources of physical server(s), such as data storage, computing power (e.g., CPU, GPU, etc.), networking, databases, etc., without direct active management by users. In some examples, the computing resource network 102 may be managed and maintained by a service provider such that users do not have to invest in and maintain the computing infrastructure for their computing resource needs. Generally, a user may be provided access to, or allocated use of, a portion of the computing resources of physical server(s) in the computing resource network 102. The computing resource network 102 may scale, such as by spinning up resources or spinning down resources, based on demand for the individual users. The portions of the computing resource network 102 may be allocated using hardware virtualization such that portions of the computing resource network 102 can be configured and managed by the user (e.g., security configuration, load balancing configuration, etc.). However, the computing resource network 102 need not be managed by a service provider, and can be managed by any entity, including the user themselves that run the applications or services.

In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, a network controller 106, network devices associated with the wide area network 104, and/or network devices associated with a network site 108, such as, for example, tenant device(s) 112 and/or MTE device(s) 110.

In some examples, a virtual machine may be configured to execute one of various operations and act as a MTE device 110. An MTE device 110 may be configured to establish one or more network session(s) with other MTE device(s) 110 associated with the computing resource network 102 using physical transport interface(s) and/or virtual transport interface(s). Additionally, or alternatively, an MTE device 110 may be configured to forward network traffic associated with one or more tenant device(s) 112 through a wide area network 104 associated with the computing resource network via the other MTE device(s) using the one or more sessions. Additionally, or alternatively, an MTE device 110 may be configured to publish a virtual transport interface associated with a tenant 114 in an overlay of a network site 108 hosting one or more tenant device(s) 112 associated with the tenant 114. Additionally, or alternatively, a virtual machine may be configured to execute one or various operations and act as a tenant device 112.

Generally, the number of tenant device(s) 112(1)-(N) and/or tenant(s) 114(1)-(N) may scale based on a number of users 116 interacting with the computing resource network 102. The users 116 may comprise one or more of individual users, groups of users (e.g., a tenant 114), organizations, businesses, or other entities that interact with the computing resource network 102 via respective user devices. The user devices may be any type of computing device capable of connecting to the computing resource network 102 via a suitable data communications network 118 such as, but not limited to, a laptop or desktop computer, a tablet computing device, a server computer, a television, or a mobile telephone. Administrative users employed by the operator of the computing resource network 102, such as administrators managing the operation of the computing resource network 102, might also connect with, manage, and utilize resources provided by the computing resource network 102 in a similar fashion.

The users 116 may provide input data 120 via the network(s) 118 to interact with the service that is supported by the tenant device(s) 112(1)-(N) running on the servers. For example, the users 116 may submit requests to process data, retrieve data, store data, and so forth such that virtual machines hosting the tenant device(s) 112(1)-(N) are spun up or spun down to process the requests based on demand. Additionally, or alternatively, the users 116 may be associated with a tenant 114 and the input data 120 may represent a tier of one or more tenant tiers for forwarding network traffic through the wide area network 104 between tenant devices 112 and/or network sites 108 via the MTE devices 110.

Take, for example, a software defined multisite WAN 104 including various network sites 108(1)-(N) hosting tenant devices 112(1)-(N) and providing associated tenants 114(1)-(N) with multi-tenant access to transport services (e.g., MPLS, internet, metro ethernet, etc.) via an MTE device 110(1)-(N) associated with a given network site 108. As previously mentioned, tenants 114 may register with the computing resource network 102 according to a tenant tier model. A tenant tier may include a list of allowed transport interfaces chosen from a set of pre-defined transport interfaces. For example, a tenant tier may include one or more allowed transport interfaces from one or more transport interfaces available for a given tenant device 112. Additionally, or alternatively, a tenant tier may include one or more additional routing attributes associated with a given tier, such as, for example, per-tenant bandwidth, routing restrictions, tenant groups, and the like. In some examples, tenant tiers may be defined (e.g., structured tiers offering various links and attributes) and/or customizable (e.g., tenant may select specific attributes and/or links they wish to utilize).

The computing resource network 102 may be configured to extend an overlay management protocol adding features configured to indicate a type of the device participating in the protocol (e.g., shared devices 110 or single tenant devices 112). In some examples, an MTE device 110 may be configured to publish its device type as a shared device, acting as a multi-tenant gateway device. Additionally, or alternatively, a tenant device 112 may be configured to publish its device type as a single tenant device, acting as a single tenant 114 utilizing the device. When registering with the computing resource network 102, the device (e.g., an MTE device 110 and/or a tenant device 112) may indicate its device type and a physical transport interface associated with the device, indicating the transport interfaces available for the device. Additionally, or alternatively, an MTE device 110 may register with the computing resource network 102 on behalf of a tenant device 112, providing the physical transport interface and device type of the tenant device 112. The SDN controller 106 may then determine a virtual transport interface for the tenant device 112. In some examples, the SDN controller 106 may determine the virtual transport interface based on the physical transport interface of the tenant device 112 and the tier associated with the tenant 114. For example, a first tenant device 112(1) may include a first physical transport interface and may be associated with a first tier, while a second tenant device 112(2) may include the same first physical transport interface and may be associated with a second tier, where the first tier is more favorable than the second tier. In some examples, the first tier may guarantee service level agreements (SLA) for the tenant 114(1), and the second tier may not guarantee SLA for the tenant 114(2). As such, the SDN controller 106 may determine a first virtual transport interface for the first tenant 114(1), configuring the first tenant device 112(1) to utilize MPLS links with 25 mbps of bandwidth, and a second virtual transport interface for the second tenant 114(2), configuring the second tenant device 112(2) to utilize internet links with 25 mbps of bandwidth. Tenant tiers and virtual transport interfaces are discussed in more detail below.

The network controller 106 may determine a virtual transport interface based at least in part on a tier of one or more tiers associated with the tenant 114. Take, for example, a tier model comprising a first tier configured as a virtual transport interface utilizing internet link(s) (e.g., a network link configured as a best-effort network link) with 25 mbps of bandwidth, a second tier configured as a virtual transport interface utilizing internet link(s) and/or MPLS link(s) (e.g., a network link configured to guarantee a SLA) with 25 mbps of bandwidth on each, a third tier configured as a virtual transport interface utilizing internet link(s) and/or MPLS link(s) with 50 mbps of bandwidth on each, and/or a fourth tier configured as a virtual transport interface utilizing tenant specified network links with a tenant specified bandwidth on each (e.g., a custom tier specified by a tenant).

Tiers may be configured using tenant specific labels representing one or more network routing attributes on a given virtual transport interface. In some examples, the network routing attributes may indicate types of network links (illustrated by the solid, dashed, and dot-dashed lines) that should be utilized in association with a given virtual transport interface for a given tenant 114, bandwidth that should be allowed on network links associated with a given virtual transport interface for a given tenant 114, restrictions on a given virtual transport interface for a given tenant 114, and/or the like. For example, the network routing attributes may indicate the bandwidth that should be allowed for given links associated with a virtual transport interface, as previously described. Additionally, the network routing attributes may indicate one or more restrictions with respect to forwarding network traffic associated with a tenant device 112 on the virtual transport interface. For example, network links (e.g., MPLS, internet, and/or any kind of WAN link) may be established connecting two separate sites 108 where the tenant 114 is present in both sites. In some examples, a tenant label on a given virtual transport interface utilized by overlay(s) associated with the sites 108 may restrict MPLS links to only other MPLS links, internet links to only other internet links, and/or the like.

The network controller 106 and/or the MTE devices 110 may utilize a pairwise key generation hierarchy to generate, store, and/or otherwise maintain unique interface mappings for each tenant 114. In some examples, a tenant label may be generated per-tenant and used to store network routing attributes associated with the tenant 114 to be utilized on a virtual transport interface when forwarding network traffic associated with a tenant device 112 of the tenant 114. The mapping may be configured such that the physical transport interface is configured as a parent label and the virtual transport interface is configured as a child label. In some examples, the child label representing the virtual transport interface may store additional parameters associated with the tenant 114 indicating the network routing attributes, allowing for the enforcement of such network routing attributes when forwarding network traffic associated with a tenant device 112 via the virtual transport interface.

Once the virtual transport interface has been determined for a given tenant device, such as, for example, tenant device A 112(1), the network controller 106 may send the physical transport interface and/or the virtual transport interface to the MTE device 110(1) that is associated with tenant device A 112(1). Additionally, or alternatively, the network controller 106 may send the virtual transport interface directly to tenant device A 112(1). The MTE device 110(1) may utilize the physical transport interface and/or the virtual transport interface to forward network traffic associated with the tenant device 112(1) and enforce the one or more routing attributes on the network traffic. For example, a first MTE device 110(1) may receive the physical transport interface and/or the virtual transport interface for tenant device A 112(1). The first MTE device 110(1) may utilize the physical transport interface associated with the tenant device 112(1) to establish a session between the first MTE device 110(1) and a second MTE device 110(2) associated with the computing resource network 102. In some examples, the first MTE device 110(1) may send the physical transport interface and/or the virtual transport interface associated with the tenant device 112(1) to the second MTE device 110(1) to establish the session.

A session may be established for a single tenant 114 and configured to route all of the tenant's 114 data through such a session. Such sessions may be configured to implement various network protocols for forwarding network traffic associated with the tenant device 112 between various MTE device(s) 110, such as, for example, internet protocol security (IPsec), bidirectional forwarding detection (BFD), and the like. Additionally, the first MTE device 110(1) may publish the virtual transport interface in the corresponding tenant overlay (e.g., an overlay associated with network site 1 108(1). As such, all of the routes learned from the second MTE device 110(2) may be created as next hop(s) and network traffic will be forwarded on the virtual transport interface associated with the tenant device 112(1).

The key 122 illustrated in FIG. 1 may represent separate sessions established between MTE device(s) 110 configured to implement the network routing attributes indicated by a tier selected by a given tenant 114. For example, a first tenant 114(1) may have one or more tenant device(s) 112(1) provisioned in a first network site 108(1). Additionally, or alternatively, while not illustrated, the first tenant 114(1) may have one or more tenant device(s) 112 provisioned in a second network site 108(2). As indicated by the key 122, first session(s) and/or first network link(s) (illustrated by solid line(s)) connecting a first MTE device 110(1) to a second MTE device 110(2) and/or a third MTE device 110(N) may be utilized for forwarding network traffic associated with the first tenant 114(1) and/or tenant device(s) A 112(1) associated with the first tenant 114(1). Additionally, or alternatively, second session(s) and/or second network link(s) (illustrated by dot-dashed line(s)) connecting a second MTE device 110(2) to a first MTE device 110(1) and/or a third MTE device 110(N) may be utilized for forwarding network traffic associated with the second tenant 114(2) and/or tenant device(s) B 112(1) associated with the second tenant 114(2). Additionally, or alternatively, third session(s) and/or third network link(s) (illustrated by small-dashed line(s)) connecting a third MTE device 110(N) to a first MTE device 110(1) and/or a second MTE device 110(2) may be utilized for forwarding network traffic associated with the third tenant 114(N) and/or tenant device(s) N 112(N) associated with the third tenant 114(N). In some examples, the sessions may be utilized by the MTE device(s) 110 to forward network traffic from a first network site 108(1) to a second network site 108(2) in which the tenant 114(1) does not have a tenant device 112(1) provisioned. Such sessions may be configured using the physical transport interface associated with a given tenant device 112 and/or a tier associated with a given tenant 114 and may be configured to implement the network routing attributes associated with the virtual transport interface associated with the given tenant device 112.

At "1," a user 116, such as, for example, an administrator and/or any other type of user 116 associated with a tenant 114(1) may provide input data 120 to the computing resource network 102. In some examples, the input data 120 may indicate a selection of a tier of one or more tiers offered to tenants 114 for configuring a virtual transport interface for forwarding network traffic associated with tenant device(s) 112(1) associated with the tenant 114(1) between network sites 108 of the wide area network 104. The input data 120 may be received by a network controller 106 associated with the wide area network 104 and/or the computing resource network 102 via one or more networks 118.

At "2," a tenant device 112(1) associated with the tenant 114(1) may send, advertise, and/or publish tenant device information associated with the tenant device 112(1) to the network controller 106. In some examples, the tenant device information may include a physical transport interface associated with the tenant device 112(1) and/or a device type associated with the tenant device 112(1) (e.g., an indication that the tenant device 112(1) is a single tenant device). Additionally, or alternatively, as previously described, the wide area network 104 overlay may include an extended overlay management protocol (OMP) configured to indicate the physical transport interface associated with the tenant device 112(1) and/or the device type associated with the tenant device 112(1) in response to the tenant device 112(1) coming online. In such examples, the network controller 106 may be configured to collect such information from the wide area network 104 overlay.

At "3," the network controller 106 may determine a virtual transport interface for the tenant 114(1) and/or the tenant device 112(1). In some examples, the network controller 106 may determine a virtual transport interface based at least partly upon the tier selected at "1," as indicated by the input data 120. The virtual transport interface may include tenant specific network routing attributes defined therein, such as, for example, type of network link(s) utilized to forward network traffic, a bandwidth allocated to the network links utilized to forward the network traffic associated with the tenant 114(1), one or more restrictions associated with the network link(s), and/or one or more groups associated with the tenant device(s) 112(1). Additionally, or alternatively, the network controller 106 may utilize the physical transport interface associated with the tenant device 112(1) to at least partly determine the virtual transport interface. For example, the virtual transport interface may be determined from a list of allowed transport interfaces as indicated by the physical transport interface (e.g., the physical transport interface may indicate the allowed transport interfaces, such as they are able to be utilized by the tenant device 112(1)).

At "4," the network controller 106 may send the virtual transport interface and/or the physical transport interface associated with the tenant device 112(1) to a first MTE device 110(1) associated with the tenant 114(1), the tenant device 112(1), and/or the network site 108(1) in which the tenant device 112(1) is provisioned.

At "5," the first MTE device 110(1) may establish one or more sessions with additional MTE device(s) 110(2)-(N) associated with the wide area network 104. For example, the first MTE device 110(1) may establish a first session with a second MTE device 110(2), as illustrated in FIG. 1 by the solid line connecting the first MTE device 110(1) to the second MTE device 110(2). Additionally, or alternatively, the first MTE device 110(1) may establish a second session with a third MTE device 110(N), as illustrated in FIG. 1 by the solid line connecting the first MTE device 110(1) to the third MTE device 110(N). In some examples, the one or more sessions (e.g., the first session and/or the second session) may be configured to enforce the one or more network routing attributes on network traffic associated with the tenant device 112(1). Such sessions may be configured to implement various network protocols for forwarding network traffic associated with the tenant device 112(1) between various MTE device(s) 110, such as, for example, internet protocol security (IPsec), bidirectional forwarding detection (BFD), and the like.

At "6," the first MTE device 110(1) may publish the virtual transport interface in the corresponding tenant overlay (e.g., an overlay associated with network site 1 108(1)). As such, all of the routes learned from the second MTE device 110(2) and/or the third MTE device 110(N) may be created as next hop(s) and network traffic will be forwarded on the virtual transport interface associated with the tenant device 112(1).

At "7," the MTE device 110(1) may forward network traffic associated with the tenant device 112(1) based at least in part on the virtual transport interface via the one or more session(s).

Figure 3:
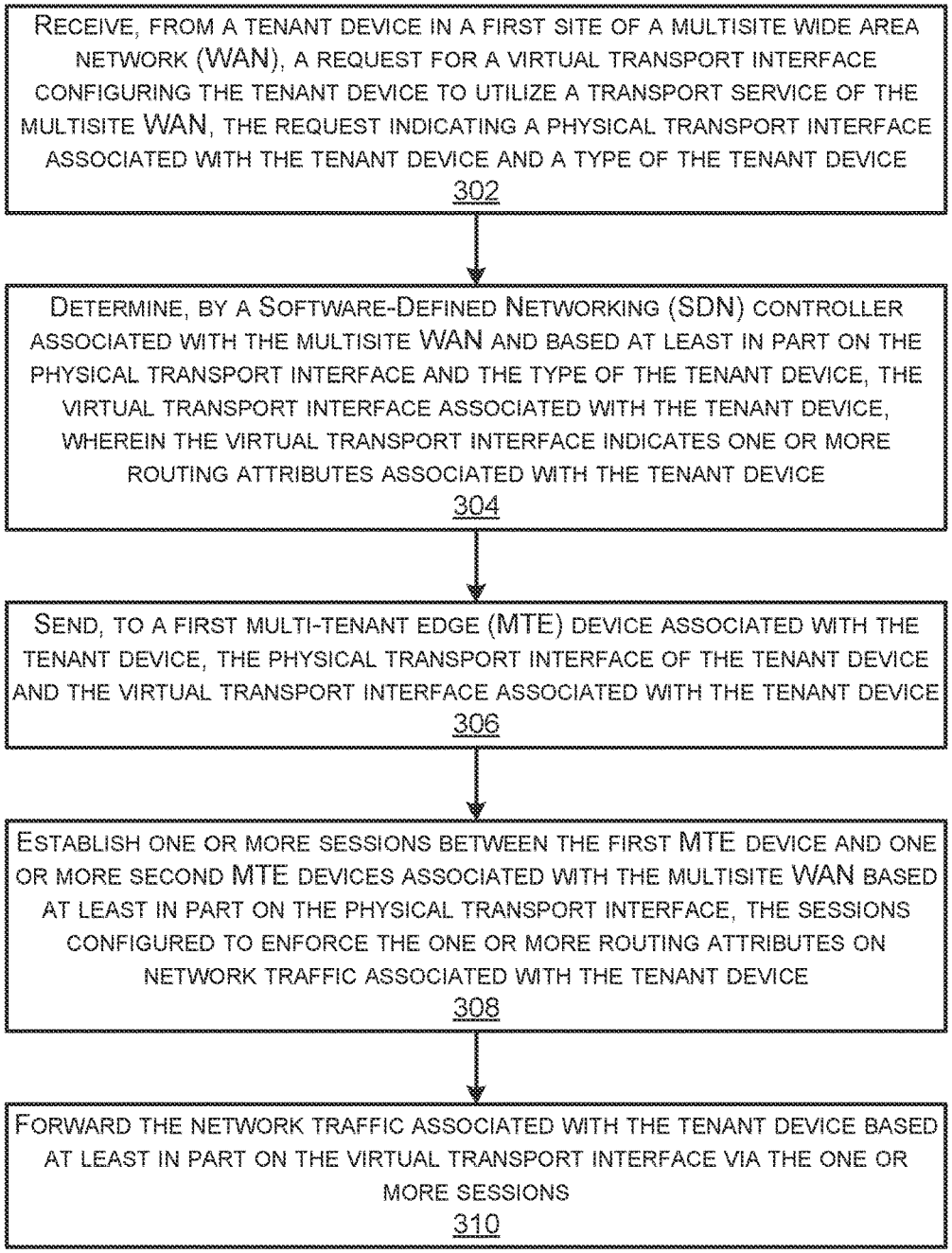
FIG. 3 illustrates a flow diagram of an example method for Software-Defined Networking (SDN) controller to determine virtual transport interfaces, based on a defined tenant tier model, utilized to provide network routing attribute differentiation in individual tenant overlays and share the virtual transport interfaces between multi-tenant edge devices to provide WAN transport service access to tenant devices according the network routing attributes associated with a defined tier.

FIGS. 2 and 3 illustrate flow diagrams of example methods 200 and 300 and that illustrate aspects of the functions performed at least partly by the computing resource network 102, the wide area network 104, the network controller 106, the MTE device(s) 110, and/or the tenant device(s) 112 as described in FIG. 1. The logical operations described herein with respect to FIGS. 2 and 3 may be implemented (1) as a sequence of computer-implemented acts or program modules running on a computing system and/or (2) as interconnected machine logic circuits or circuit modules within the computing system. In some examples, the method(s) 200 and/or 300 may be performed by a system comprising one or more processors and one or more non-transitory computer-readable media storing computer-executable instructions that, when executed by the one or more processors, cause the one or more processors to perform the method(s) 200 and/or 300.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2 and 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 2 illustrates a flow diagram of an example method 200 for an MTE device of a multisite WAN to receive virtual transport interfaces, determined based on a defined tenant tier model by a network controller associated with the multisite WAN, utilized to provide network routing attribute differentiation in individual tenant overlays, share the virtual transport interfaces with other MTE devices associated with the multisite WAN, establish pertenant sessions with the other MTE devices, and provide WAN transport service access to tenant devices according the network routing attributes associated with a defined tier. In some examples, the MTE device(s), the multisite WAN, the network controller, and/or the tenant device(s) may correspond to the MTE device(s) 110, the wide area network 104, the network controller 106, and/or the tenant device(s) 112 as described with respect to FIG. 1.

At 202, the method 200 includes receiving an indication that a tenant device has connected to the first site. In some examples, the indication may be received at a first multi-tenant edge (MTE) device associated with a first site of a multisite wide area network (WAN). Additionally, or alternatively, the indication may include a physical transport interface associated with the tenant device. In some examples, the first site may correspond to a network site 108 as described with respect to FIG. 1.

At 204, the method 200 includes sending a request for a virtual transport interface configuring the tenant device to utilize a transport service of the multisite WAN. In some examples, the request may be sent from the first MTE device and to a Software-Defined Networking (SDN) controller (also referred to herein as a network controller) associated with the multisite WAN. Additionally, or alternatively, the request may be sent based at least in part on the indication. Additionally, or alternatively, the request may include the physical transport interface of the tenant device and/or a type of the tenant device. In some examples, the type of the tenant device may indicate that the tenant device is a single tenant device.

At 206, the method 200 includes receiving the virtual transport interface including an indication of one or more routing attributes associated with the tenant device. In some examples, the virtual transport interface may be received at the first MTE device and from the SDN controller.

At 208, the method 200 includes establishing a first session between the first MTE device and a second MTE device associated with a second site of the multisite WAN. In some examples, the first session may be established at least partly by the first MTE device and/or based at least in part on the physical transport interface of the tenant device and/or the virtual transport interface. Additionally, or alternatively, the first session may be configured to provide the one or more routing attributes associated with the tenant device.

At 210, the method 200 includes sending, from the first MTE device and to the tenant device, the virtual transport interface. In some examples, the first MTE device may publish the virtual transport interface in a network overlay associated with a network site in which the tenant device is provisioned.

At 212, the method 200 includes forwarding network traffic from the tenant device and to the second MTE device via the first session. In some examples, the network traffic may be forwarded by the first MTE device and/or based at least in part on the virtual transport interface. For example, the first MTE device may forward the network traffic using first session configured to enforce the one or more routing attributes on the network traffic associated with the tenant device.

In some examples, the one or more routing attributes may indicate at least one of network links associated with the first session configured to guarantee a service level agreement (SLA), the network links associated with the first session configured as a best-effort network link, one or more restrictions of the network links associated with the first session, and/or a bandwidth guarantee of the network links associated with the first session.

In some examples, the one or more routing attributes associated with the tenant device may be based at least in part on the physical transport interface associated with the tenant device.

Additionally, or alternatively, the method 200 may include publishing, by the first MTE device, the virtual transport interface in a network overlay associated with the first site of the multisite WAN in association with the tenant device.

Additionally, or alternatively, the method 200 may include sending, from the first MTE device and to the one or more second MTE devices, the virtual transport interface associated with the tenant device and/or the physical transport interface associated with the tenant device. In some examples, establishing the one or more sessions between the first MTE device and the one or more second MTE devices may comprise causing, by the SDN controller, the one or more second MTE devices to establish the one or more sessions with the first MTE device using the physical transport interface.

Additionally, or alternatively, the method 200 may include receiving configuration data at the SDN controller and from a computing device associated with the tenant device. Additionally, or alternatively, the method 200 may include determining, by the SDN controller and based at least in part on the configuration data, a tier of one or more tiers associated with forwarding the network traffic associated with the tenant device. In some examples, the tier may indicate the one or more routing attributes associated with the tenant device. Additionally, or alternatively, the method 200 may include determining, by the SDN controller and based at least in part on the tier, the virtual transport interface.

FIG. 3 illustrates a flow diagram of an example method 300 for Software-Defined Networking (SDN) controller to determine virtual transport interfaces, based on a defined tenant tier model, utilized to provide network routing attribute differentiation in individual tenant overlays and share the virtual transport interfaces between multi-tenant edge (MTE) devices to provide WAN transport service access to tenant devices according the network routing attributes associated with a defined tier. In some examples, the MTE device(s), the WAN, the network controller, and/or the tenant device(s) may correspond to the MTE device(s) 110, the wide area network 104, the network controller 106, and/or the tenant device(s) 112 as described with respect to FIG. 1.

At 302, the method 300 includes receiving a request for a virtual transport interface configuring the tenant device to utilize a transport service of the multisite WAN. In some examples, the request may be received from a tenant device in a first site of a multisite wide area network (WAN). Additionally, or alternatively, the request may indicate a physical transport interface associated with the tenant device and/or a type of the tenant device. In some examples, the first site may correspond to a network site 108 as described with respect to FIG. 1. In some examples, the type of the tenant device may indicate that the tenant device is a single tenant device.

At 304, the method 300 includes determining the virtual transport interface associated with the tenant device. In some examples, a Software-Defined Networking (SDN) controller associated with the multisite WAN may be configured to determine the virtual transport interface based at least in part on the physical transport interface and the type of the tenant device. Additionally, or alternatively, the virtual transport interface may indicate one or more routing attributes associated with the tenant device.

At 306, the method 300 includes sending the physical transport interface of the tenant device and/or the virtual transport interface associated with the tenant device. In some examples, the SDN controller may send the physical transport interface to a first multi-tenant edge (MTE) device associated with the tenant device.

At 308, the method 300 includes establishing one or more sessions between the first MTE device and one or more second MTE devices associated with the multisite WAN based at least in part on the physical transport interface. In some examples, the sessions may be configured to enforce the one or more routing attributes on network traffic associated with the tenant device.

At 310, the method 300 includes forwarding the network traffic associated with the tenant device. In some examples, forwarding the network traffic may be based at least in part on the virtual transport interface via the one or more sessions. Additionally, or alternatively, the first MTE device may forward the network traffic associated with the tenant device via the one or more sessions. Additionally, or alternatively, the SDN controller may cause the first MTE device to forward the network traffic associated with the tenant device via the one or more sessions.

Additionally, or alternatively, the method 300 includes receiving configuration data from a computing device associated with the tenant device. Additionally, or alternatively, the method 300 includes determining, based at least in part on the configuration data, a tier of one or more tiers associated with forwarding the network traffic associated with the tenant device. In some examples, the tier may indicate the one or more routing attributes associated with the tenant device. Additionally, or alternatively, the method 300 includes determining, based at least in part on the tier, the virtual transport interface.

In some examples, the one or more routing attributes indicate at least one of network links associated with the one or more sessions configured to guarantee a service level agreement (SLA), the network links associated with the one or more sessions configured as a best-effort network link, one or more restrictions of the network links associated with the one or more sessions, a bandwidth guarantee of the network links associated with the one or more sessions.

In some examples, the one or more routing attributes associated with the tenant device may be based at least in part on the physical transport interface associated with the tenant device.

In some examples, establishing the one or more sessions between the first MTE device and the one or more second MTE devices may comprise causing, by the SDN controller, the first MTE device to establish the one or more sessions with the one or more second MTE devices using the physical transport interface.

Additionally, or alternatively, the method 300 includes publishing, by the first MTE device, the virtual transport interface in a network overlay associated with the first site of the multisite WAN in association with the tenant device.

Additionally, or alternatively, the method 300 includes sending, from the first MTE device and to the one or more second MTE devices, the virtual transport interface associated with the tenant device and the physical transport interface associated with the tenant device. In some examples, establishing the one or more sessions between the first MTE device and the one or more second MTE devices may comprise causing, by the SDN controller, the one or more second MTE devices to establish the one or more sessions with the first MTE device using the physical transport interface.

Figure 4:
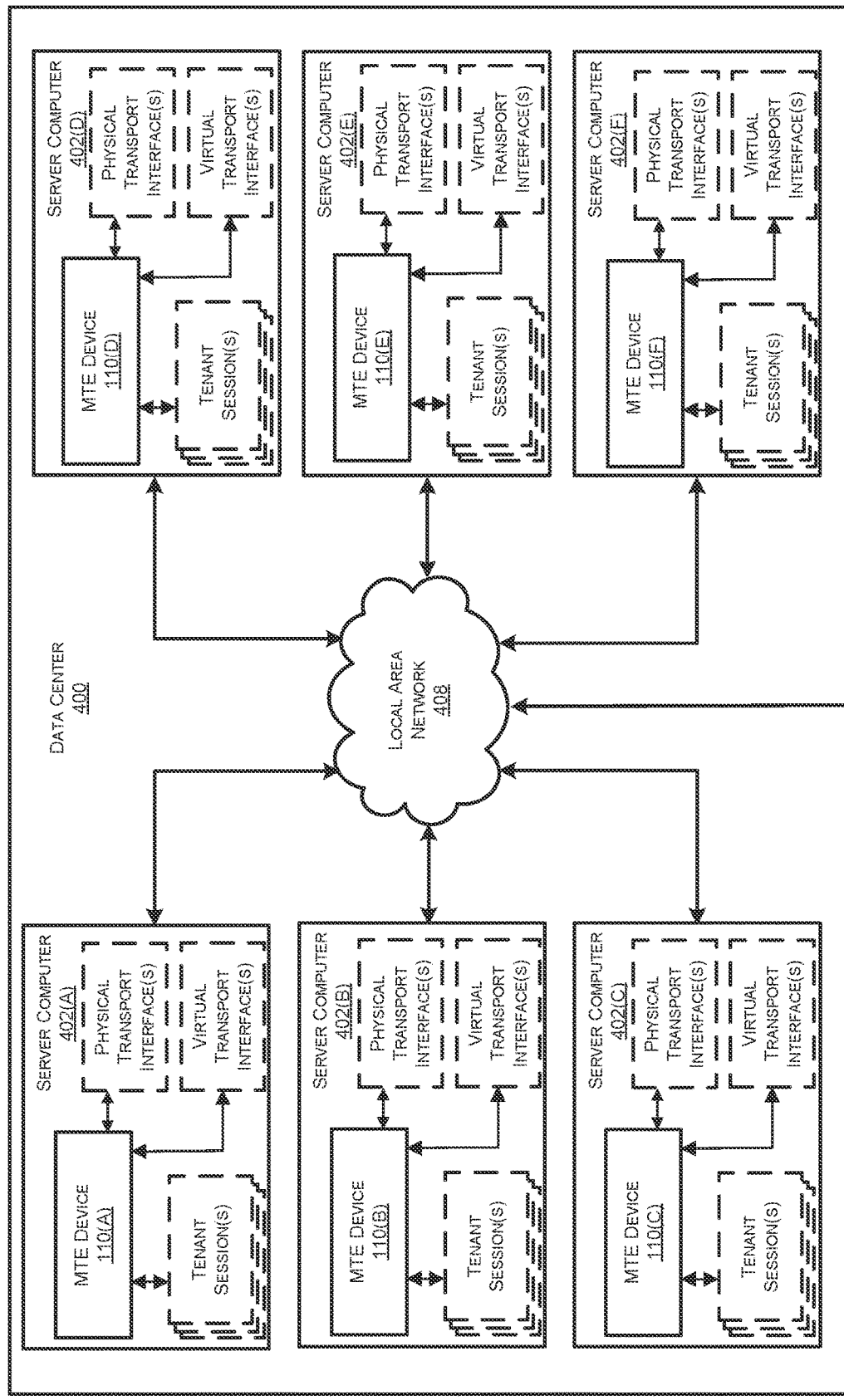
FIG. 4 illustrates a computing system diagram illustrating a configuration for a data center that can be utilized to implement aspects of the technologies disclosed herein.

FIG. 4 is a computing system diagram illustrating a configuration for a data center 400 that can be utilized to implement aspects of the technologies disclosed herein. The example data center 400 shown in FIG. 4 includes several server computers 402A-402E (which might be referred to herein singularly as "a server computer 402" or in the plural as "the server computers 402") for providing computing resources. In some examples, the server computers 402 may include, or correspond to, servers associated with a data center described herein with respect to FIG. 1.

The server computers 402 can be standard tower, rack-mount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 402 can also be configured to execute a resource manager capable of instantiating and/or managing the computing resources. In the case of VM instances, for example, the resource manager can be a hypervisor or another type of program configured to enable the execution of multiple VM instances on a single server computer 402. Server computers 402 in the data center 400 can also be configured to provide network services and other types of services.

In the example data center 400 shown in FIG. 4, an appropriate LAN 408 is also utilized to interconnect the server computers 402A-402E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the server computers 402A-402E in each data center 400, and, potentially, between computing resources in each of the server computers 402. It should be appreciated that the configuration of the data center 400 described with reference to FIG. 4 is merely illustrative and that other implementations can be utilized.

In some examples, the server computers 402 may each execute one or more networking devices associated with a network site 108, such as, for example, an MTE device 110. Additionally, or alternatively, the sever computers 402 may each execute one or more networking devices associated with the wide area network 104, such as, for example, the network controller 106. Additionally, or alternatively, the server computers 402 may each store information related to tenant session(s), physical transport interface(s) associated with tenant device(s) 112, and/or virtual transport interface(s) associated with tenant device(s) 112.

In some instances, the computing resource network 102 may provide computing resources, like application containers, VM instances, and storage, on a permanent or an as-needed basis. Among other types of functionality, the computing resources provided by the computing resource network 102 may be utilized to implement the various services described above. The computing resources provided by the computing resource network 102 can include various types of computing resources, such as data processing resources like application containers and VM instances, data storage resources, networking resources, data communication resources, network services, and the like.

Each type of computing resource provided by the computing resource network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing resources network 102 can also be configured to provide other types of computing resources not mentioned specifically herein.

The computing resources provided by the computing resource network 102 may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regard to FIG. 5.

Figure 5:
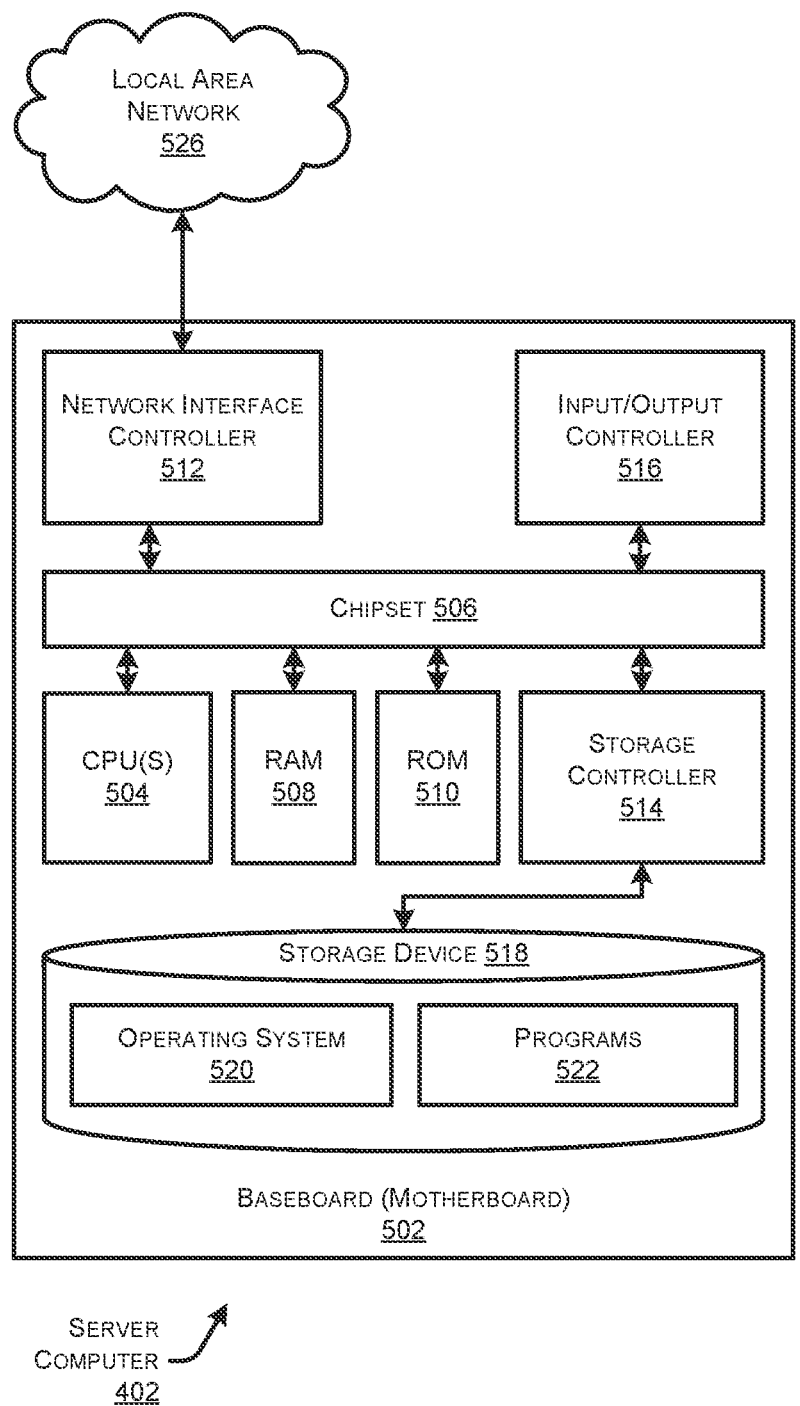
FIG. 5 is a computer architecture diagram showing an illustrative computer hardware architecture for implementing a server device that can be utilized to implement aspects of the various technologies presented herein.

FIG. 5 shows an example computer architecture for a computing device (or network routing device) 402 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 402 may in some examples, correspond to a physical server of a data center described herein with respect to FIG. 1.

The computing device 402 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computing device 402.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computing device 402. The chipset 506 can further provide an interface to a computer-readable storage medium such as a read-only memory ("ROM") 510 or non-volatile RAM ("NVRAM") for storing basic routines that help to startup the computing device 402 and to transfer information between the various components and devices. The ROM 510 or NVRAM can also store other software components necessary for the operation of the computing device 402 in accordance with the configurations described herein.

The computing device 402 can operate in a networked environment using logical connections to remote computing devices and computer systems through a network, such as the network 526. The chipset 506 can include functionality for providing network connectivity through a NIC 512, such as a gigabit Ethernet adapter. The NIC 512 is capable of connecting the computing device 402 to other computing devices over the network 526. It should be appreciated that multiple NICs 512 can be present in the computing device 402, connecting the computer to other types of networks and remote computer systems.

The computing device 402 can be connected to a storage device 518 that provides non-volatile storage for the computing device 402. The storage device 518 can store an operating system 520, programs 522, and data, which have been described in greater detail herein. The storage device 518 can be connected to the computing device 402 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 402 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computing device 402 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 402 can further read information from the storage device 518 by detecting the physical states or characteristics of one or more particular locations within the physical storage units.

In addition to the mass storage device 518 described above, the computing device 402 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 402. In some examples, the operations performed by the computing resource network 102, and or any components included therein, may be supported by one or more devices similar to computing device 402. Stated otherwise, some or all of the operations performed by the computing resource network 102, and or any components included therein, may be performed by one or more computing device 402 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computing device 402. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computing device 402.

In one embodiment, the storage device 518 or other computer-readable storage media is encoded with computer-executable instructions which, when loaded into the computing device 402, transform the computer from a general-purpose computing system into a special-purpose computer capable of implementing the embodiments described herein. These computer-executable instructions transform the computing device 402 by specifying how the CPUs 504 transition between states, as described above. According to one embodiment, the computing device 402 has access to computer-readable storage media storing computer-executable instructions which, when executed by the computing device 402, perform the various processes described above with regard to FIGS. 1-3. The computing device 402 can also include computer-readable storage media having instructions stored thereupon for performing any of the other computer-implemented operations described herein.

The computing device 402 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computing device 402 might not include all of the components shown in FIG. 5, can include other components that are not explicitly shown in FIG. 5, or might utilize an architecture completely different than that shown in FIG. 5.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
 receiving, at a first multi-tenant edge (MTE) device associated with a first site of a multisite wide area network (WAN), an indication that a tenant device has connected to the first site, the indication including a physical transport interface associated with the tenant device;
 sending, from the first MTE device and to a Software-Defined Networking (SDN) controller associated with the multisite WAN based at least in part on the indication, a request for a virtual transport interface configuring the tenant device to utilize a transport service of the multisite WAN, the request including the physical transport interface of the tenant device and a type of the tenant device;
 receiving, at the first MTE device and from the SDN controller, the virtual transport interface including an indication of one or more routing attributes associated with the tenant device;
 establishing, at least partly by the first MTE device and based at least in part on the physical transport interface of the tenant device and the virtual transport interface, a first session between the first MTE device and a second MTE device associated with a second site of the multisite WAN, the session configured to provide the one or more routing attributes associated with the tenant device;
 sending, from the first MTE device and to the tenant device, the virtual transport interface; and
 forwarding, by the first MTE device and based at least in part on the virtual transport interface, network traffic from the tenant device and to the second MTE device via the first session.

2. The method of claim 1, wherein the one or more routing attributes indicate at least one of:
 network links associated with the first session configured to guarantee a service level agreement (SLA);
 the network links associated with the first session configured as a best-effort network link;
 one or more restrictions of the network links associated with the first session; or
 a bandwidth guarantee of the network links associated with the first session.

3. The method of claim 1, wherein the one or more routing attributes associated with the tenant device are based at least in part on the physical transport interface associated with the tenant device.

4. The method of claim 1, further comprising publishing, by the first MTE device, the virtual transport interface in a network overlay associated with the first site of the multisite WAN in association with the tenant device.

5. The method of claim 1, further comprising sending, from the first MTE device and to the one or more second MTE devices, the virtual transport interface associated with the tenant device and the physical transport interface associated with the tenant device,
wherein establishing the one or more sessions between the first MTE device and the one or more second MTE devices comprises causing, by the SDN controller, the one or more second MTE devices to establish the one or more sessions with the first MTE device using the physical transport interface.

6. The method of claim 1, further comprising:
receiving configuration data at the SDN controller and from a computing device associated with the tenant device;
determining, by the SDN controller and based at least in part on the configuration data, a tier of one or more tiers associated with forwarding the network traffic associated with the tenant device, the tier indicating the one or more routing attributes associated with the tenant device; and
determining, by the SDN controller and based at least in part on the tier, the virtual transport interface.

7. The method of claim 1, further comprising receiving, at the first MTE device and from the SDN controller, an instruction to establish the first session using the physical transport interface, and wherein establishing the first session is based at least in part on receiving the instruction.

8. A system comprising:
one or more processors; and
one or more computer-readable media storing computer-executable instructions that, when executed by the one or more processors, cause the one or more processors to perform operations comprising:
receiving, at a first multi-tenant edge (MTE) device associated with a first site of a multisite wide area network (WAN), an indication that a tenant device has connected to the first site, the indication including a physical transport interface associated with the tenant device;
sending, from the first MTE device and to a Software-Defined Networking (SDN) controller associated with the multisite WAN based at least in part on the indication, a request for a virtual transport interface configuring the tenant device to utilize a transport service of the multisite WAN, the request including the physical transport interface of the tenant device and a type of the tenant device;
receiving, at the first MTE device and from the SDN controller, the virtual transport interface including an indication of one or more routing attributes associated with the tenant device;
establishing, at least partly by the first MTE device and based at least in part on the physical transport interface of the tenant device and the virtual transport interface, a first session between the first MTE device and a second MTE device associated with a second site of the multisite WAN, the session configured to provide the one or more routing attributes associated with the tenant device;
sending, from the first MTE device and to the tenant device, the virtual transport interface; and
forwarding, by the first MTE device and based at least in part on the virtual transport interface, network traffic from the tenant device and to the second MTE device via the first session.

9. The system of claim 8, wherein the one or more routing attributes indicate at least one of:
network links associated with the first session configured to guarantee a service level agreement (SLA);
the network links associated with the first session configured as a best-effort network link;
one or more restrictions of the network links associated with the first session; or
a bandwidth guarantee of the network links associated with the first session.

10. The system of claim 8, wherein the one or more routing attributes associated with the tenant device are based at least in part on the physical transport interface associated with the tenant device.

11. The system of claim 8, the operations further comprising publishing, by the first MTE device, the virtual transport interface in a network overlay associated with the first site of the multisite WAN in association with the tenant device.

12. The system of claim 8, the operations further comprising sending, from the first MTE device and to the one or more second MTE devices, the virtual transport interface associated with the tenant device and the physical transport interface associated with the tenant device,
wherein establishing the one or more sessions between the first MTE device and the one or more second MTE devices comprises causing, by the SDN controller, the one or more second MTE devices to establish the one or more sessions with the first MTE device using the physical transport interface.

13. The system of claim 8, the operations further comprising:
receiving configuration data at the SDN controller and from a computing device associated with the tenant device;
determining, by the SDN controller and based at least in part on the configuration data, a tier of one or more tiers associated with forwarding the network traffic associated with the tenant device, the tier indicating the one or more routing attributes associated with the tenant device; and
determining, by the SDN controller and based at least in part on the tier, the virtual transport interface.

14. The system of claim 8, the operations further comprising receiving, at the first MTE device and from the SDN controller, an instruction to establish the first session using the physical transport interface, and wherein establishing the first session is based at least in part on receiving the instruction.

15. One or more non-transitory computer-readable media storing computer-executable instructions that, when executed by one or more processors, cause the one or more processors to perform operations comprising:
receiving, at a first multi-tenant edge (MTE) device associated with a first site of a multisite wide area network (WAN), an indication that a tenant device has connected to the first site, the indication including a physical transport interface associated with the tenant device;
sending, from the first MTE device and to a Software-Defined Networking (SDN) controller associated with the multisite WAN based at least in part on the indication, a request for a virtual transport interface configuring the tenant device to utilize a transport service of the multisite WAN, the request including the physical transport interface of the tenant device and a type of the tenant device;

receiving, at the first MTE device and from the SDN controller, the virtual transport interface including an indication of one or more routing attributes associated with the tenant device;

establishing, at least partly by the first MTE device and based at least in part on the physical transport interface of the tenant device and the virtual transport interface, a first session between the first MTE device and a second MTE device associated with a second site of the multisite WAN, the session configured to provide the one or more routing attributes associated with the tenant device;

sending, from the first MTE device and to the tenant device, the virtual transport interface; and forwarding, by the first MTE device and based at least in part on the virtual transport interface, network traffic from the tenant device and to the second MTE device via the first session.

16. The one or more non-transitory computer-readable media of claim 15, wherein the one or more routing attributes indicate at least one of:

network links associated with the first session configured to guarantee a service level agreement (SLA);

the network links associated with the first session configured as a best-effort network link;

one or more restrictions of the network links associated with the first session; or a bandwidth guarantee of the network links associated with the first session.

17. The one or more non-transitory computer-readable media of claim 15, wherein the one or more routing attributes associated with the tenant device are based at least in part on the physical transport interface associated with the tenant device.

18. The one or more non-transitory computer-readable media of claim 15, the operations further comprising publishing, by the first MTE device, the virtual transport interface in a network overlay associated with the first site of the multisite WAN in association with the tenant device.

19. The one or more non-transitory computer-readable media of claim 15, the operations further comprising sending, from the first MTE device and to the one or more second MTE devices, the virtual transport interface associated with the tenant device and the physical transport interface associated with the tenant device, wherein establishing the one or more sessions between the first MTE device and the one or more second MTE devices comprises causing, by the SDN controller, the one or more second MTE devices to establish the one or more sessions with the first MTE device using the physical transport interface.

20. The one or more non-transitory computer-readable media of claim 15, the operations further comprising:

receiving configuration data at the SDN controller and from a computing device associated with the tenant device;

determining, by the SDN controller and based at least in part on the configuration data, a tier of one or more tiers associated with forwarding the network traffic associated with the tenant device, the tier indicating the one or more routing attributes associated with the tenant device; and determining, by the SDN controller and based at least in part on the tier, the virtual transport interface.

* * * * *